(12) United States Patent
Brazier

(10) Patent No.: US 9,828,048 B2
(45) Date of Patent: Nov. 28, 2017

(54) STAGGERED IDLER WHEEL TRACK ASSEMBLY

(71) Applicant: Glen Brazier, Karlstad, MN (US)

(72) Inventor: Glen Brazier, Karlstad, MN (US)

( * ) Notice: Subject to any disclaimer, the term of this patent is extended or adjusted under 35 U.S.C. 154(b) by 121 days.

(21) Appl. No.: 14/998,604

(22) Filed: Jan. 25, 2016

(65) Prior Publication Data

US 2017/0210436 A1    Jul. 27, 2017

(51) Int. Cl.
*B62D 55/14* (2006.01)
*B62D 55/08* (2006.01)
*B62D 55/10* (2006.01)

(52) U.S. Cl.
CPC .............. *B62D 55/14* (2013.01); *B62D 55/08* (2013.01); *B62D 55/10* (2013.01)

(58) Field of Classification Search
CPC ......... B62D 55/14; B62D 55/10; B62D 55/08
USPC ....... 305/129, 130, 132, 135, 136, 137, 140, 305/138, 142; 180/9.21, 9.28, 9.26
See application file for complete search history.

(56) References Cited

U.S. PATENT DOCUMENTS

| | | | | |
|---|---|---|---|---|
| 3,688,858 | A * | 9/1972 | Jespersen | B62D 55/06 180/89.1 |
| 6,904,986 | B2 * | 6/2005 | Brazier | B62D 49/0635 180/9.21 |
| 8,911,031 | B2 * | 12/2014 | Bessette | B62D 55/04 305/128 |
| 2001/0001431 | A1 * | 5/2001 | Lemke | B62D 55/10 180/9.5 |

* cited by examiner

*Primary Examiner* — S. Joseph Morano
*Assistant Examiner* — Jean Charleston
(74) *Attorney, Agent, or Firm* — O. L. Tschida

(57) ABSTRACT

An improved track frame assembly wherein the idler wheels are arranged to prevent loss of track contact with the terrain. Seriatim primary idler wheels are aligned to longitudinal outer lateral track edges. Secondary idler wheels are mounted interiorly of the outer wheels and longitudinally staggered to prevent the track from lifting or "caterpillaring" in spaces intermediate the primary idler wheels. The numbers, diameters, widths and positions of the secondary idler wheels are selected to overlap the track contact points of the primary idler wheels. A resiliently biased and/or slippery presser member, roller or slide assembly can alternatively be mounted to prevent vertical track flexion.

20 Claims, 9 Drawing Sheets

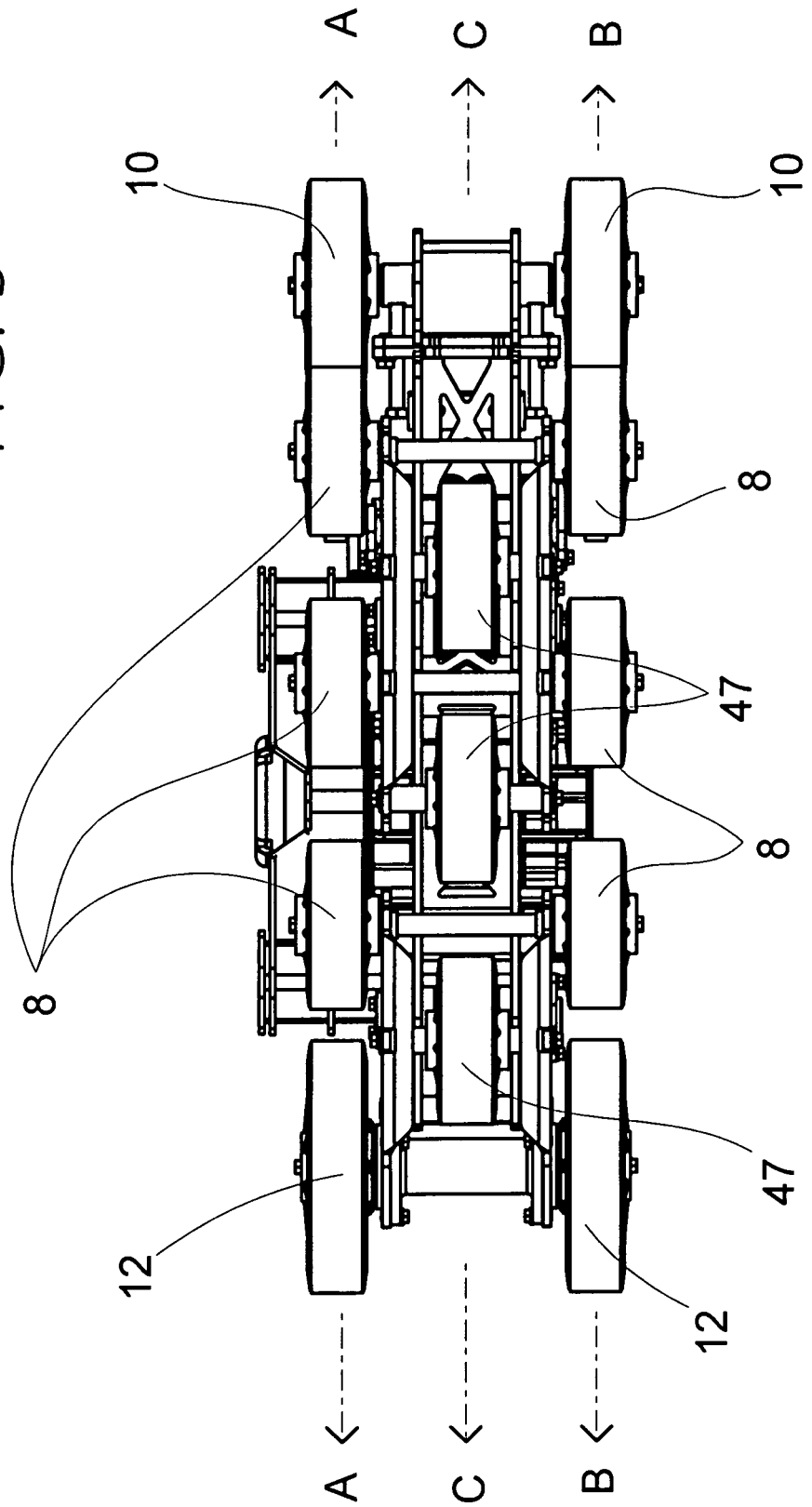

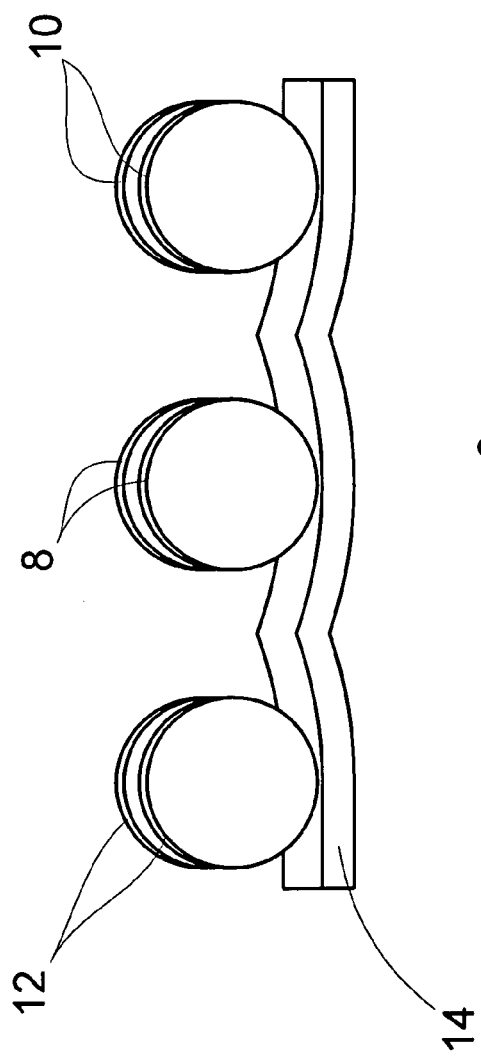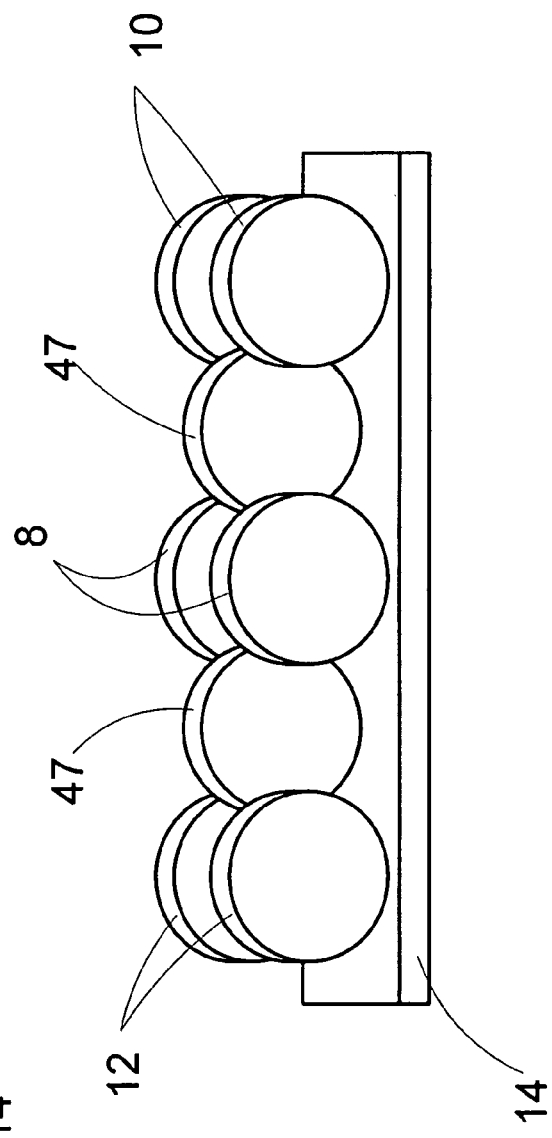

STAGGERED IDLER WHEEL TRACK ASSEMBLY

BACKGROUND OF THE INVENTION

The present invention relates to a track assembly having a track trained in endless fashion to circumscribe a supporting framework including a drive sprocket and a plurality of idler wheels mounted to the framework to prevent "caterpillaring" (i.e. flexing of the track in spaces between seriatim mounted idler/road wheels).

Track supported vehicles and equipment are designed for a variety of applications. The tracks enhance traction, distribute vehicle weight and reduce loading over an enlarged ground contact surface versus wheels and tires. Track systems of various designs are commonly used with military, commercial, farm, construction, personal (e.g. truck) and sport/leisure (e.g. snowmobiles and ATV) vehicles. Tracks are also used in a variety of other applications with passive, un-powered equipment, for example, trailers, irrigation equipment and the like.

Depending upon the application, the track support framework and/or mounting system desirably provides some freedom of movement at the track assembly to flex and otherwise compensate for dynamically changing terrain conditions and/or to enhance operating performance and/or track retention. Typically, the framework is mounted to pivot as obstructions are encountered and passed over. A track assembly of applicant that provides torsion control to prevent contact between a track assembly and a supporting vehicle is shown at U.S. Pat. No. 5,607,210. Other track assemblies developed by applicant are shown at U.S. Pat. Nos. 6,904,986; 6,926,105; 7,533,741 and 8,083,242.

The foregoing track assemblies generally provide for left and right, symmetrically arranged idler or road wheels that are longitudinally aligned in seriatim fashion along the bottom of the track to support a rubber, belted track. Longitudinal gaps are thereby defined between the leading and lagging idler wheels that can reduce a track's operating efficiency and even exaggerate track wear. That is, a flexing, lifting or buckling of the track can occur in the space between the seriatim idler wheels. The flexion arises from a normal degree of slack in the track tension during track rotation as rocks, logs, pothole edges and other contour variations are encountered in the terrain.

The flexing or buckling of the track reduces the contact surface area of the track with the terrain which lessens the track support and increases the contact pressure at the track footprint. The buckling or flexion can also induce fatigue in the cording of a rubber track and lessen the operating life of the track. Under some circumstances the track can also dislodge from the track assembly and support framework.

The present invention was developed to provide a track assembly and support framework wherein a plurality of secondary track support idler wheels are mounted in a staggered arrangement at the bottom drive surface of the track relative to normally provided primary right and left arrangements of seriatim idler wheel. The staggered secondary idler wheels prevent buckling or caterpillaring of the track in the spaces between the primary idler wheels.

One arrangement provides a track support framework having a first set of primary or outer idler wheels longitudinally mounted in generally conventional seriatim fashion that rotate parallel to and adjacent the lateral peripheral edges of the track. A secondary set of idler wheels are mounted interiorly of the primary outer idler wheels and contact the drive surface of the track in longitudinal regions between the outer wheels. The interior wheels are located to stabilize the track in the intermediate spaces between the primary idler wheels and prevent flexing and/or buckling of the track in the longitudinal spaces between the seriatim outer wheels.

SUMMARY OF THE INVENTION

It is a primary object of the invention to provide a track assembly that reduces flexion of the track drive surface to maintain contact between the drive surface and terrain in the longitudinal spaces between primary track supporting idler wheels.

It is further object of the invention to provide a track assembly having a first or primary set of idler wheels arranged adjacent longitudinal right and left lateral edges of the track and a second set of idler wheels mounted intermediate and laterally staggered inward and longitudinally offset from the first set of idler wheels to prevent track flexion in intermediate spaces between the primary sets of idler wheels.

It is further object of the invention to provide an endless track assembly having a plurality of primary idler wheels arranged on common support axles and aligned parallel to lateral peripheral edges of the track and a plurality of secondary idler wheels mounted to independent axles longitudinally intermediate and laterally staggered from the primary idler wheels to support the track in the spaces between adjoining seriatim sets of the primary sets of idler wheels.

It is further object of the invention to provide first and second sets of seriatim, longitudinally aligned primary idler wheels mounted to support a drive track and a plurality of secondary idler wheels having diameters, widths and/or mountings that support the track in longitudinal spaces between the primary idler wheels.

It is further object of the invention to provide a track subassembly having a framework supporting a primary set of idler wheels mounted to opposite ends of several longitudinally displaced transverse extending first axles and a secondary set of idler wheels mounted to independent second axles and arranged such that the diameters, widths and/or mountings of the secondary idler wheels at the second axles longitudinally overlap the longitudinal spaces between the first axles and primary idler wheels.

It is further object of the invention to provide a track subassembly including a framework supporting several primary idler wheels mounted to at least one transverse extending first axle and at least one secondary idler wheel mounted to an independent second axle such that the diameters of the primary and secondary idler wheels longitudinally overlap.

It is further object of the invention to provide an endless track assembly having a primary set of idler wheels aligned seriatim to rotate parallel to lateral edges of a rubber drive track and a secondary track support subassembly (e.g. wheels, presser members, slide members etc.) mounted to the track support framework laterally offset interiorly of the primary idler wheels to prevent the drive surface of the track from flexing away from ground contact in spaces between the successive primary idler wheels.

The foregoing objects, advantages and distinctions of the present invention are obtained in alternative track frame assemblies disclosed herein. The present invention was developed to provide an improved track frame assembly wherein multiple sets of primary idler, ground or bogey wheels are mounted to a track support framework along a track to terrain engaging footprint to minimize and/or prevent the dynamically changing track drive surface from losing contact with the terrain at the track footprint. Secondary, interiorly mounted idler wheels are mounted to particularly prevent track flexion and loss of terrain contact at track surfaces intermediate longitudinally successive primary track support idler wheels. The track is thereby maintained in optimal contact with the terrain, especially over flat surfaces. Power transfer efficiency and weight distribution is improved and track life is enhanced due to reduced track flexion.

In one construction, a primary set of idler wheels of a track assembly are arranged along a framework to provide multiple paired sets of primary idler wheels wherein each set is mounted to a single axle that extends transverse to the framework. Each paired set of primary idler wheels are longitudinally displaced from each other adjacent the lateral peripheral edges of the track. The primary idler wheel sets can be mounted to independent axles and/or to connecting common axles. At least one other set of secondary idler wheels are mounted to the framework and longitudinally staggered in the longitudinal space between the seriatim primary idler wheel sets such that the diameters of the secondary set of idler wheels overlap the diameter(s) of at least one of fore and aft primary idler wheels at one primary idler wheel set.

The longitudinal and lateral spacing of the secondary idler wheels resists any tendency of the track to flex in the longitudinal spaces between the primary idler wheels. The drive track is thereby supported in a fashion that prevents the track from lifting or "caterpillaring" in intermediate spaces between the primary idler wheel sets. The combination of the primary and secondary idler wheels maintains the track in constant contact with the terrain. Power transfer is enhanced since the entire idler wheel supported footprint of the track engages the terrain.

The idler wheels can exhibit a variety of different diameters. Idler wheels mounted to forward and aft ends of a track assembly framework can exhibit larger diameters than intermediate primary and secondary interior wheels. A first set of appropriately sized primary wheels can be mounted to common or independent first axles. A second set of secondary (anti-caterpillaring) idler wheels can be mounted to different independent or common second axles and can exhibit different diameters and/or widths versus the primary idler wheels. The primary and secondary sets of idler wheels can be mounted in staggered arrangement to a single support framework or via multiple sub-frames and/or from independent axles. The sets of primary and secondary idler wheels in all cases are arranged to prevent caterpillaring of the track.

In certain circumstances a slide piece, shoe or other presser member or assembly can be mounted to contact and/or resist flexion of the interior track drive surface between longitudinally displaced primary idler wheels to prevent caterpillaring. The presser assembly can include longitudinal rails, rollers of other devices that contact or are slightly displaced above the drive surface to restrain and/or prevent the track drive surface from losing contact with the terrain in spaces between the primary idler wheels. The presser assembly can be used alone or in combination with longitudinally staggered secondary idler wheels.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. It is also to be appreciated the singular improvements can be combined in any variety of track assemblies. The invention should therefore be interpreted within the broad scope of the further appended claims.

BRIEF DESCRIPTION OF THE DRAWINGS

FIG. 5 shows a bottom plan view of the track assembly of FIG. 4 wherein the outer primary idler wheels are aligned along longitudinal axes "A" and "B" and wherein the secondary interior idler wheels are aligned seriatim along a longitudinal axis "C" and the diameters of the secondary idler wheels overlap the diameters of the primary idler wheels.

FIG. 6 shows an illustrative line diagram of a conventional prior art idler wheel arrangement and exhibiting the "caterpillaring" effect between the seriatim sets of idler wheels which is alleviated with the track assembly of FIG. 1.

FIG. 7 shows an illustrative line diagram of a track assembly designed to provide diametrically overlapping primary outer and secondary inner sets of idler wheels arranged to prevent the "caterpillaring" effect.

DESCRIPTION OF THE PREFERRED EMBODIMENTS

Figure 1:
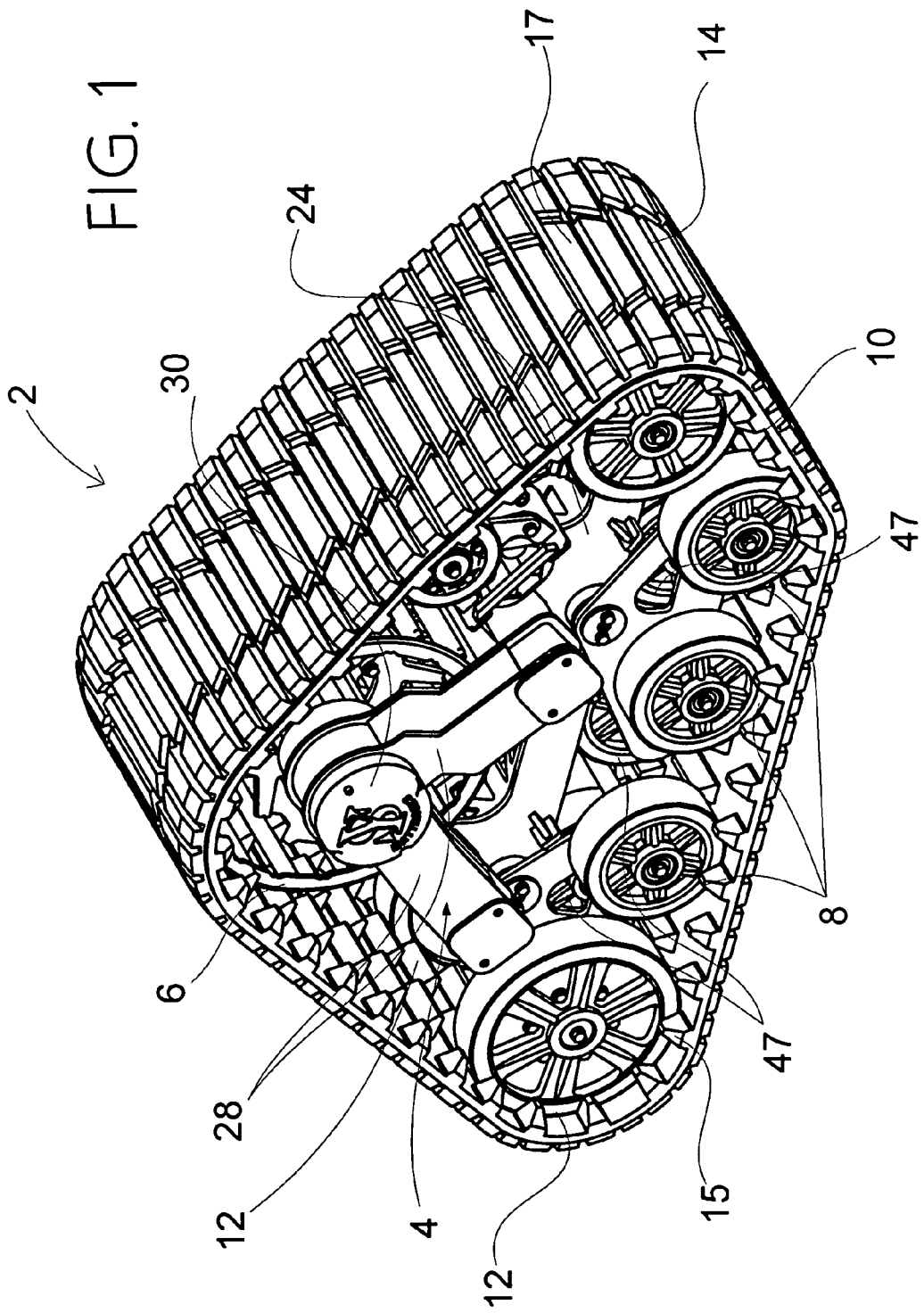
FIG. 1 is a perspective drawing depicting front, top and a right end view of a track assembly including seriatim primary idler wheels aligned to support outer peripheral track edges and secondary idler wheels mounted in longitudinal interior spaces between the primary idler wheels.
Figure 2:
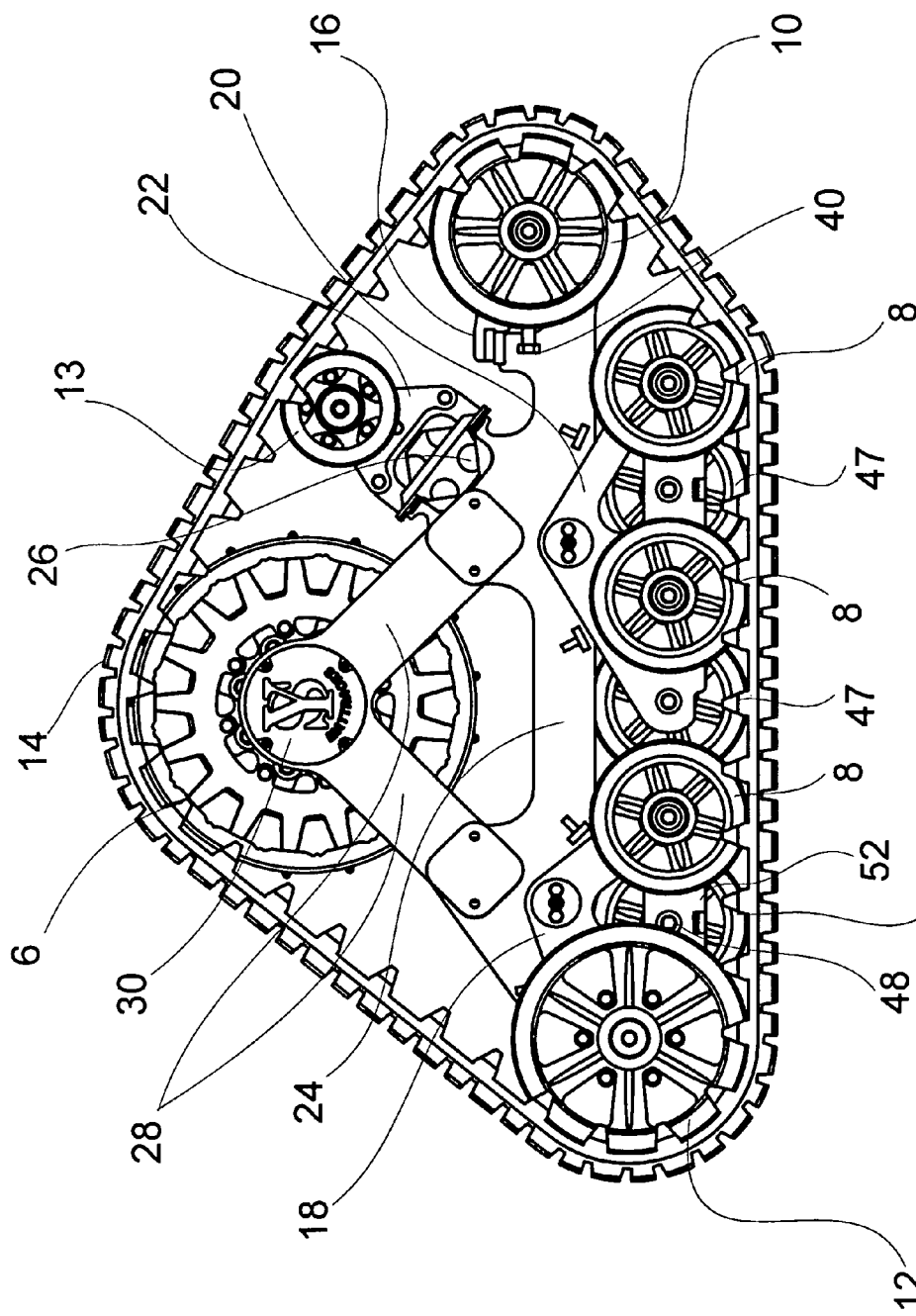
FIG. 2 depicts a front plan view of the track assembly of FIG. 1 and wherein the diameter of the internal secondary set of idler wheels are shown to longitudinally overlap the diameters of outer wheels.

With attention to the perspective and side views of FIGS. 1 and 2, an improved endless track assembly 2 of the invention is shown. The assembly 2 provides a framework 4 that supports a track drive sprocket 6, and a number of primary intermediate idler wheels 8 and forward and aft primary idler wheels 10 and 12. A drive track 14 circumscribes the framework 4 and primary idler wheels 8, 10 and 12. The track 14 is arranged in endless fashion and rotates in response to the interaction of the drive sprocket 6 with drive lugs 15 that project from the interior drive surface of the track 14. The sets of primary idler wheels 8, 10 and 12 supports the track 14 depending ground contact lugs 17 in contact with the terrain.

The drive lugs 15 project from the interior surfaces of the drive track 14 and can exhibit a variety of shapes, sizes and arrangements. Drive lugs 15 aligned to the drive sprocket 6 are designed to interconnect with drive teeth at the sprocket 6 which in the present assembly comprise a plurality of transverse bars that span the width of the sprocket 6. The drive lugs 15 are arranged to span the track 14 yet define longitudinal channels between the lugs along the outer lateral interior bottom surface of the track 14 that restrict lateral movement of the track 14. The idler wheels 8, 10, 12 and 13 rotate and travel in the channels as the track 14 is driven by power applied via the sprocket 6.

The exterior or terrain contacting surface of the track 14 includes a plurality of ground contact lugs 17. The ground contact lugs 17 can take a variety of forms and shapes and can be arranged in a variety of patterns. The "footprint" or portion of the exterior surface of the track 14 in contact with the terrain distributes the vehicle weight and continuously adapts to the encountered surface character of the terrain. The depending ground contact lugs 17 grip the terrain at the footprint and appropriately direct the track 14 and travel direction of the supported vehicle (not shown)

The framework 4 includes forward, aft, intermediate and upper support sub-frame assemblies 16, 18, 20 and 22 that pivot or extend from the framework 4. The sub-frame assemblies 16, 18, 20 and 22 are shown in detail at FIGS. 8, 9, 10 and 11. The sub-frame assemblies 16, 18 and 20 pivot from a horizontal primary longitudinal frame arm 24 which can comprise one or more sections. Presently the frame arm 24 is constructed as a single section with two sidewall pieces coupled together with appropriate transverse brace pieces.

The upper sub-frame assembly 22 projects from a torsion control support coupler 26 secured to the primary frame arm 24. The primary frame arm 24, in turn, is secured to transverse arms 28 that depend from an apex defined by a coupler housing 30. The coupler housing 30 supports a power transfer axle that drives the drive sprocket 6 and to which drive power is applied from a drive vehicle (not shown).

Figure 11:
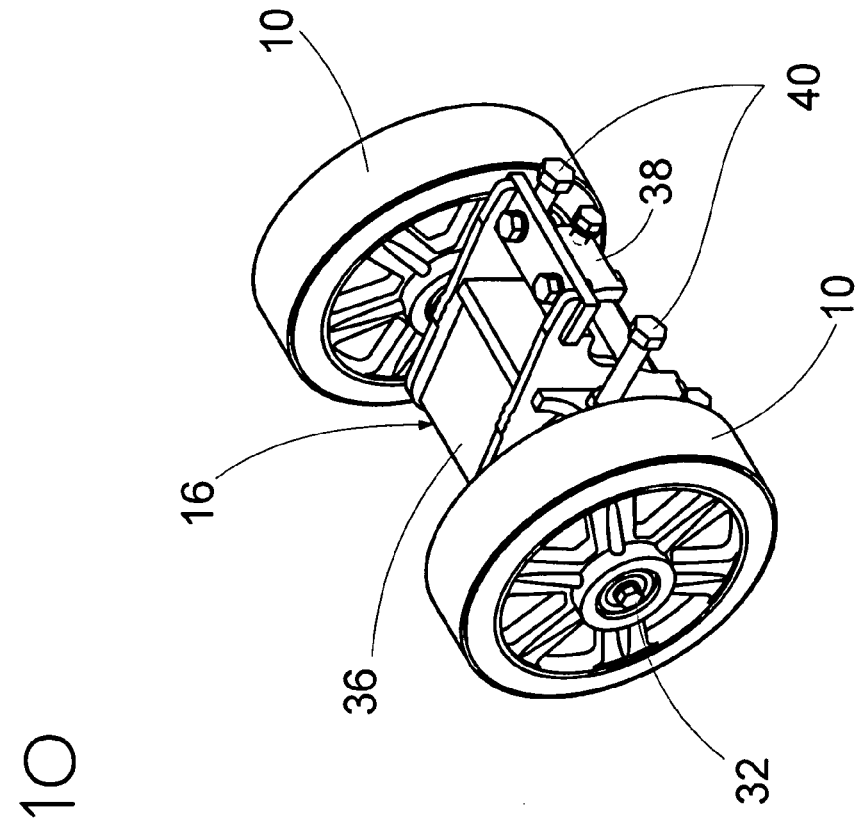
FIG. 11 depicts a perspective view of a track tensioner assembly at the framework that supports the forward primary idler wheels of the track assembly of FIG. 1.

With additional attention to FIG. 11, the forward subframe assembly 16 supports a pair of forward, relatively large diameter track supporting primary idler wheels 10 from opposite ends of an axle 32. The forward primary idler wheels 10 extend from the forward end of the frame arm 24 and are elevated above the following intermediate and aft primary idler wheels 8 and 12. The forward primary idler wheels 10 cooperate with frame pieces 36 and 38. The frame piece 36 attaches to the primary frame arm 24 and the axle 32 transversely extends through the frame piece 36. Adjusters 40 (e.g. threaded members) cooperate with the frame pieces 36 and 38 and frame arm 24 to longitudinally extend and retract the axle 32 and wheels 10 from the frame arm 24 and thereby establish the tension of the track 14 relative to the framework 4.

Figure 8:
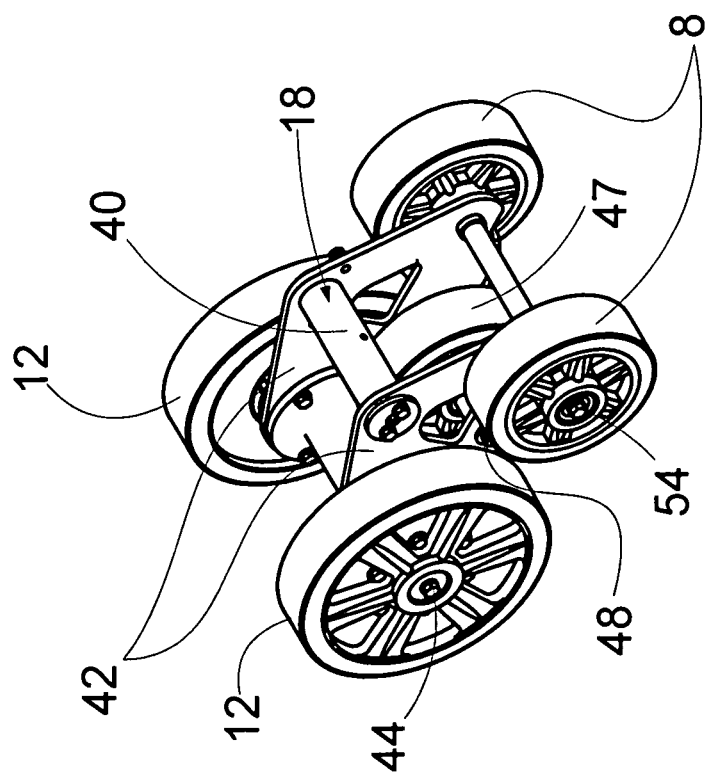
FIG. 8 depicts a perspective view of an aft idler wheel suspension assembly of the track assembly of FIG. 1 and included primary and longitudinally staggered secondary idler wheels.

With additional attention to FIG. 8, the aft sub-frame assembly 18 mounts to the primary frame arm 24 at a pivot axle 40. Frame pieces 42 support an axle 44 and to the ends of which a pair of the relatively large diameter rear primary idler wheels 12 are mounted. The track 14 rotates about the primary idler wheels 12 at an aft end of a ground contact region of the drive track 14. A second pair of smaller diameter intermediate primary idler wheels 8 are mounted to an axle 46 that transversely extends between the frame pieces 42. The intermediate and rear primary idler wheels 8 and 12 are coaxially aligned along parallel longitudinal axes "A" and "B" (see FIG. 5) and rotate parallel to the lateral, outer peripheral edges of the track 14.

The sub-frame 18 also supports a secondary idler wheel 47. The secondary idler wheel 47 is supported from an axle 48 that extends between the frame pieces 42. The axle 48 is positioned between the axles 44 and 46 to cause the laterally and longitudinally offset inner secondary idler wheel 47 to tangentially contact the interior drive surface of the track 14 in the space between the contact surfaces of the outer primary idler wheels 8 and 12. The secondary idler wheel is aligned to a longitudinal axis "C" that extends parallel to and laterally intermediate the axes "A" and "B".

The staggered positioning of the secondary idler wheel 47 prevents upward flexion in the longitudinal space between the wheels 12 and 8. The contact area of the inner secondary wheel 47 can be varied by varying the width and/or lateral spacing of the inner wheel 47. Multiple inner secondary wheels 47 can also be used for wider track assemblies 2. Other mechanisms discussed below with respect to FIG. 12 may also be used alone or in combination with the secondary idler wheels 8 to prevent upward track flexion in the longitudinal spaces between the outer primary idler wheels 8, 10 and 12.

Figure 9:
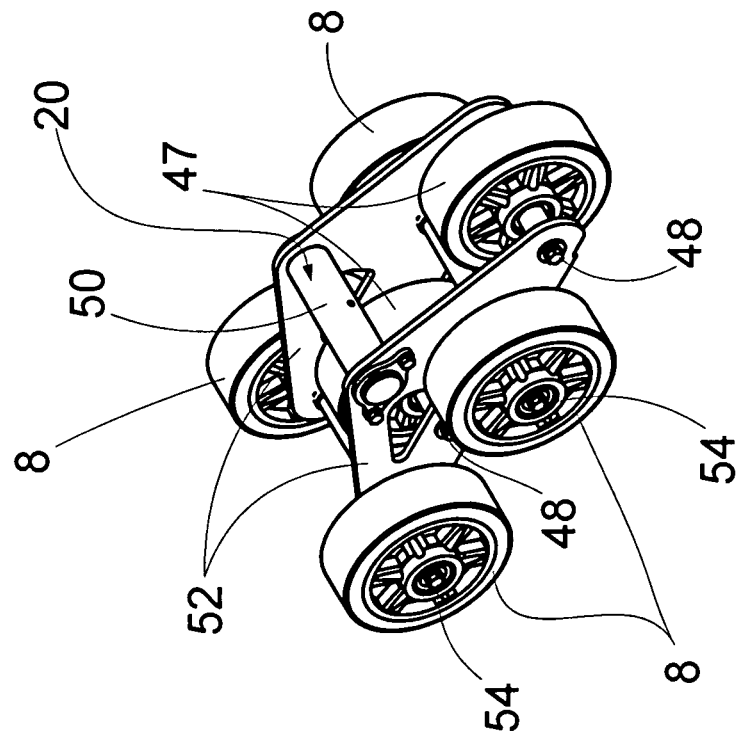
FIG. 9 depicts a perspective view of an intermediate idler wheel suspension assembly of the track assembly of FIG. 1 and included primary and longitudinally staggered secondary idler wheels.

The intermediate sub-frame assembly 20, shown in detail at FIG. 9, is mounted to the horizontal primary frame arm 24 at a pivot axle 50. The assembly 20 is mounted between the forward and aft sub-frame assemblies 16 and 18. Sub-frame pieces 52 support two sets of the relatively smaller diameter outer primary idler wheels 8 at opposite ends of axles 54. The axles 54 transversely extend between the frame pieces 52 intermediate the forward and aft sub-frame assemblies 16 and 18. The intermediate primary idler wheels are aligned with the primary idler wheels 10 and 18 along the parallel longitudinal axes "A" and "B".

A pair of secondary idler wheels 47 are supported to axles 48 interiorly of the outer primary idler wheels 8. The axles 48 are longitudinally staggered relative to the axles 54 to cause the inner secondary idler wheels 47 to contact the interior drive surface of the track 14 in the space between the contact regions of the outer primary idler wheels 8. The intermediate secondary idler wheel 47 are aligned along the longitudinal axis "C" with the secondary idler wheel 47 at the rear sub-frame assembly 18.

Figure 3:
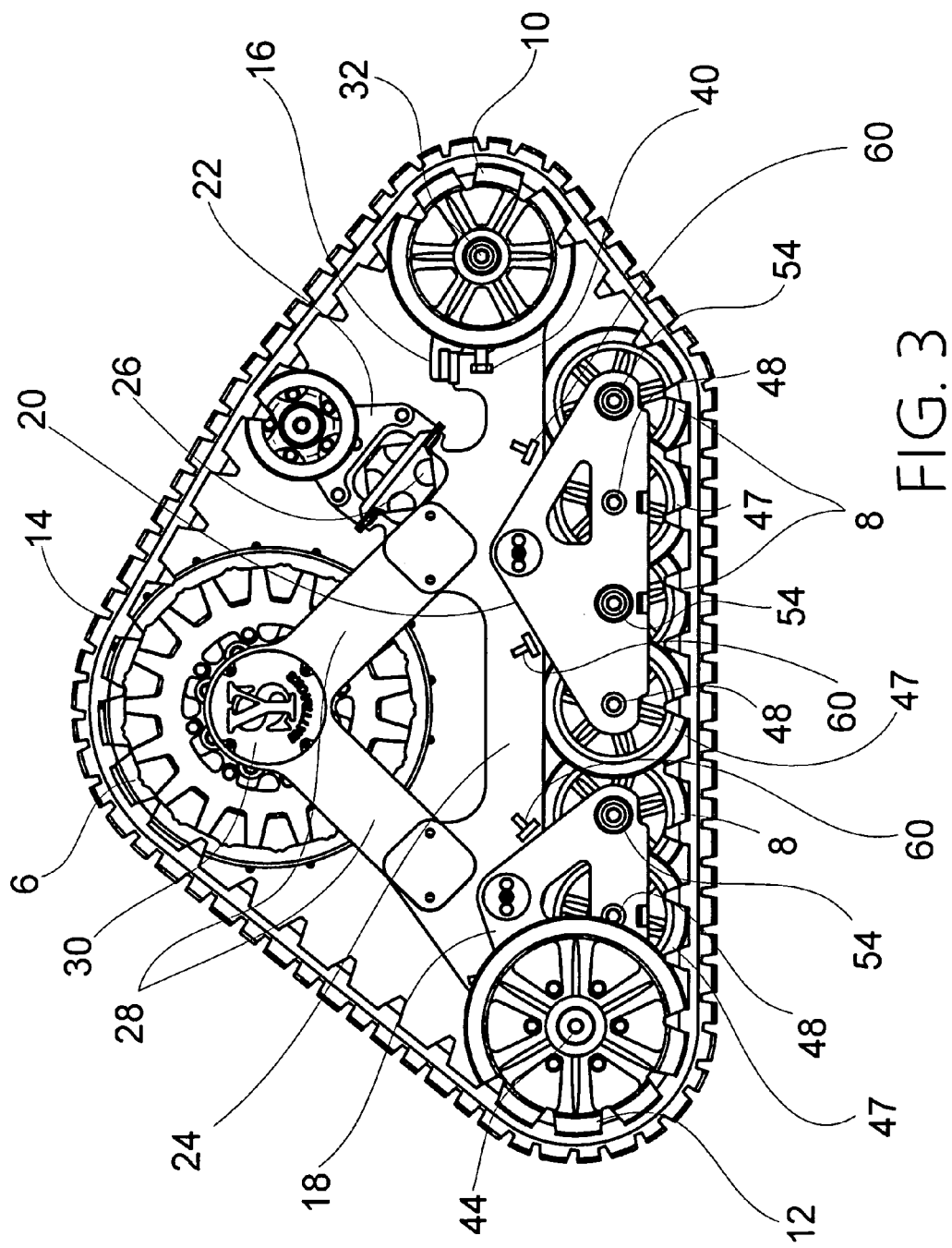
FIG. 3 shows a front plan view of the track assembly of FIG. 2 with several of the outer primary idler wheels removed and wherein the overlapping diameters of the secondary set of interior idler wheels is apparent relative to the laterally opposed primary idler wheels aligned along the lateral peripheral track edge at the rear of the assembly.
Figure 4:
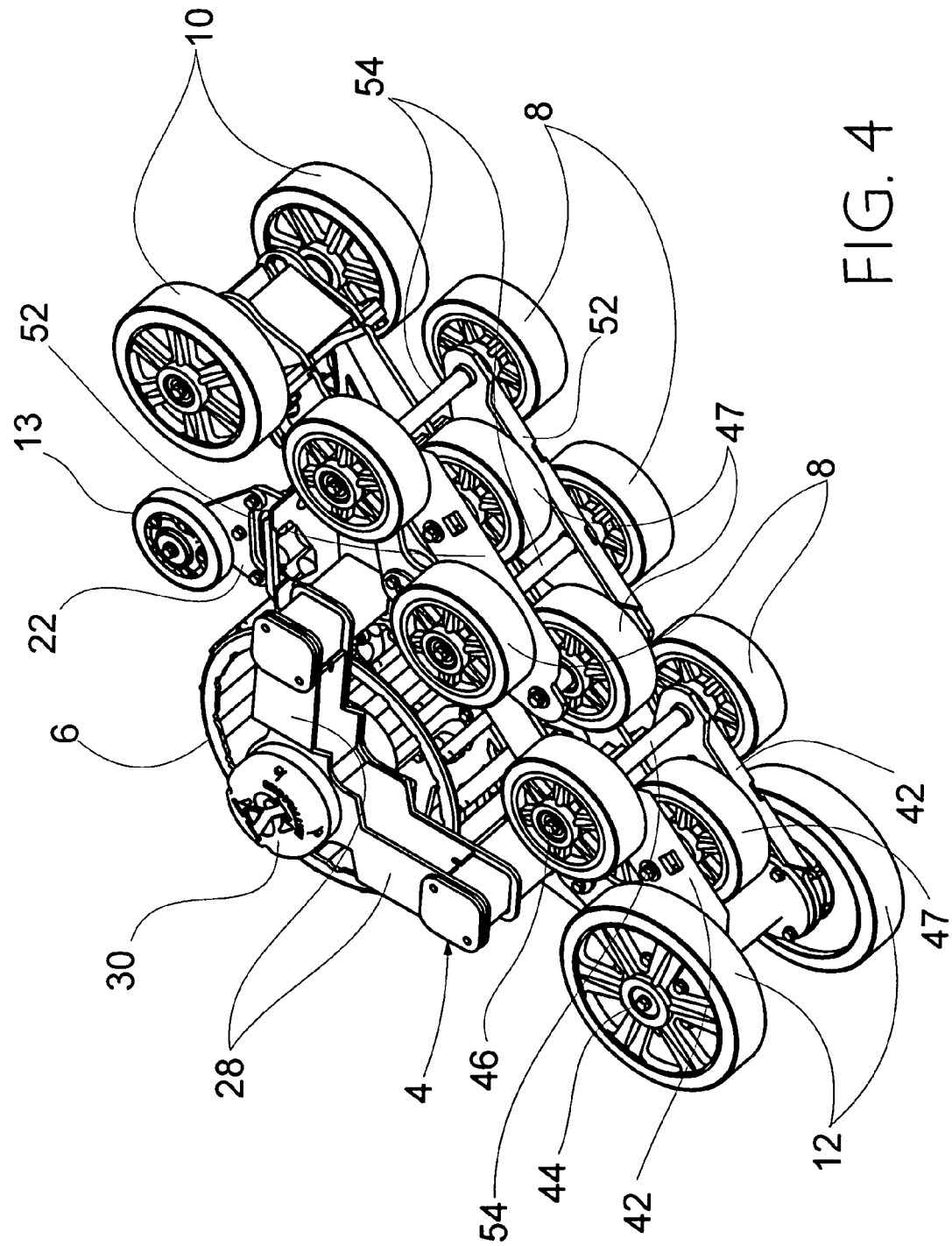
FIG. 4 is a perspective drawing of the track assembly of FIG. 1 without the surrounding track and depicting bottom and front views of the framework, staggered arrangement of the primary and secondary idler wheels.

With additional attention to FIG. 3, rigid or resilient stops 60 project from the sides of the primary frame arm 24 to limit rotation of the sub-frame assembly 20. Elastomer bushings, shims or a variety of spring-type, pneumatic or other resilient mechanisms can be included to cooperate with the stops 60 to dampen pivotal movements of either of the sub-frame assemblies 18 and/or 20.

Figure 10:
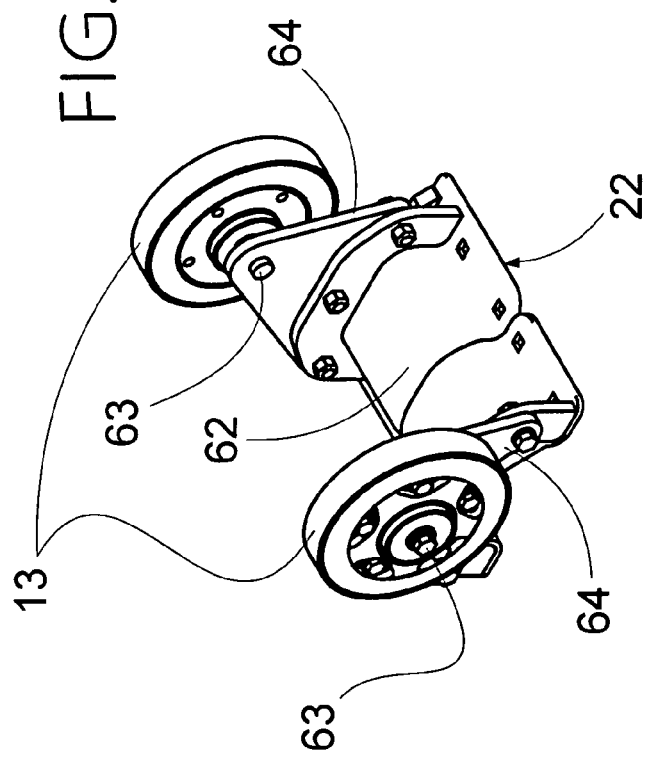
FIG. 10 depicts a perspective view of an upper track support assembly mounted intermediate the drive sprocket and forward primary idler wheels of the track assembly of FIG. 1.

The upper sub-frame assembly 22, shown in detail at FIG. 10, provides a cover plate 62 to the torsion control arm 26. Axles 63 extend from projecting uprights 64 to accept upper primary idler wheels 13. The upper primary idler wheels 13 are mounted to align with and overly the lower primary idler wheels 8, 10 and 12 and rotate parallel to the lateral peripheral edges of the track 14.

The upper sub-frame assembly 22 cooperates with the track tension adjuster assembly 16 to stabilize the drive track 14 as it passes over the outer primary idler wheels 8, 10 and 12, inner secondary idler wheels 47, and drive sprocket 6. The upper sub-frame assembly 22 supports the track 14 in the relatively long space between the forward primary idler wheels 10 and drive sprocket 6 to minimize track flexion and oscillation.

As discussed above, the secondary idler wheel supporting axles 48 are positioned or longitudinally staggered in the longitudinal space between the axles 44, 54 and 56 and the outer primary idler wheels 8, 10 and 12. The secondary idler wheels 47 thereby stabilize the track 14 at interior track contact surfaces located between the track contact surfaces of the primary idler wheels 8, 10 and 12.

Presently, the diameters of the inner secondary idler wheels 47 overlap the diameters of the outer primary idler wheels 8, 10 and 12, see FIGS. 2 - 6. The staggered secondary inner wheels 47 depress interior surface regions of the track 14 in the longitudinal spaces between the successive outer primary wheels 8, 10 and 12 as shown diagrammatically in FIG. 7. The track 14 is thereby prevented from flexing vertically (i.e. caterpillaring) in the fashion of prior art tracks shown in FIG. 6. The undesired vertical track flexion reduces ground contact of the track 14 which lessens power transfer and weight distribution of the track 14.

Although the secondary inner idler wheels 47 are generally aligned along the longitudinal axis "C" and the center of the track 14, the secondary wheels 47 can be laterally staggered to one or both of the sides of the axis "C" via shims or spacer bushings at the axles 48. The width and/or diameter(s) of the secondary wheels 47 can also be varied to assure a desired anti-caterpillaring contact with the track 14. The lateral sides 42 and 52 of the sub-frames 18 and 20 can also be formed to appropriately position and stagger the secondary idler wheels 47 to assure proper track to ground contact. Multiple secondary wheels 47 might also be mounted to the axles 48. More or less secondary interior wheels 47 can also be provided to accommodate any number of outer primary idler wheels 8 10 and 12.

Figure 12:
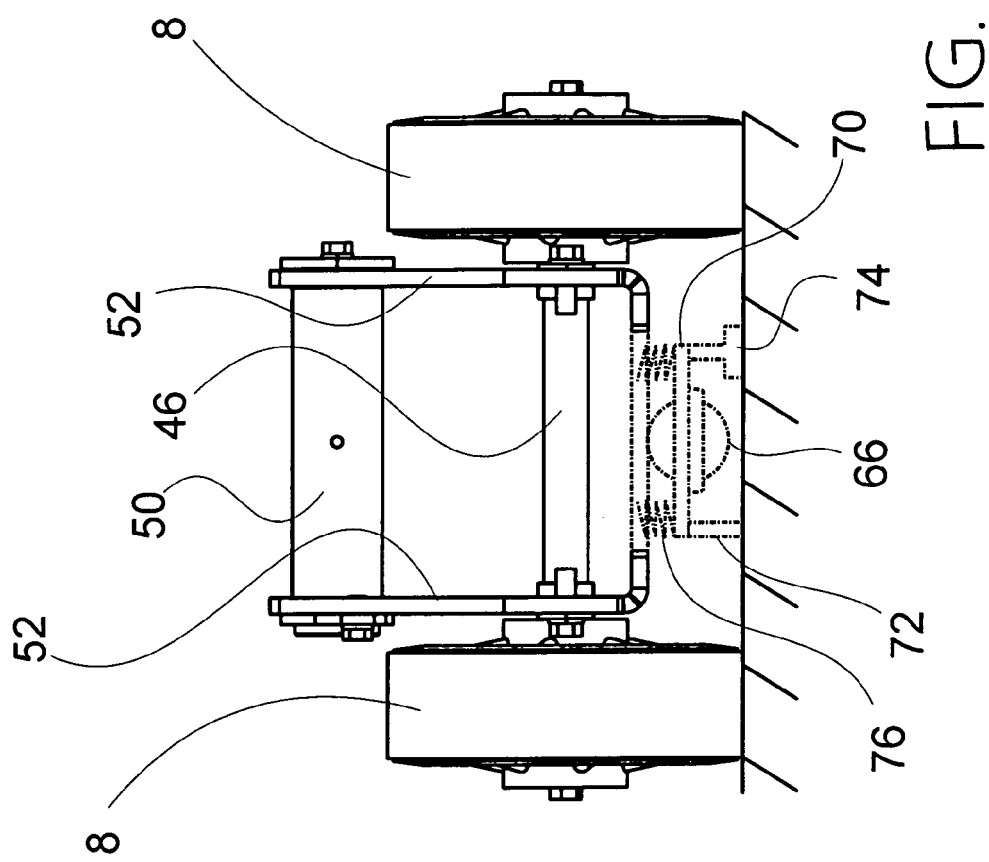
FIG. 12 depicts an illustrative end view of a portion of a track assembly including an exemplary presser assembly including exemplary wheel, rail, ball and/or flanged presser members and associated biasing means that is mounted to contact or resist vertical flexion and caterpillaring of the track drive surface at surface regions of the drive track intermediate the depicted laterally and longitudinally offset primary idler wheels.

With attention to FIG. 12 and in lieu of and/or in combination with the secondary idler wheels 47, other members can be supported to the framework 4 in the lateral and lateral spaces between the contact points of the primary idler wheels with the track 14 to prevent or limit track flexion or caterpillaring and loss of ground contact at the footprint of the drive track 14 with the terrain. For example, a frame or "presser" piece 70 can be fitted to the framework 4 or frame pieces 42 and/or 52 to support a projecting rail(s) 72 which can be coated with high density polymer material. An inverted "T" flanged projection(s) 74 can be mounted to depend from the frame piece 70 to resist track flexion. The rail 72 and/or flanged projection 74 can be constructed to provide one or more surfaces that contact or closely align to the interior surface of the track 14. One or more captured ball(s) 66 can similarly be supported in contact or adjacent the interior surface of the track 14 to achieve a similar effect.

The rail(s) 72, flange(s) 74 and ball(s) 66 are shown in dashed line and can be mounted alone or in combination in contact or in close association to interior track surfaces to prevent or limit vertical track flexion. Preferably any non-rotating internal track support should exhibit a slippery interface with the track 10 to prevent abrasion and wear. The presser piece 70 assembly might also be resiliently mounted to the framework 4 with a spring, elastomer, pneumatic member or the like. The presser assembly is thereby provided with a degree of vertical resilience relative to the revolving track drive surface which can prevent damaging the track 14 at the regions of contact between the interior surface an the rail(s) 72, flange(s) 74 and/or ball(s) 66.

While the invention has been described with respect to a presently preferred and considered alternative assemblies and considered improvements, modifications and/or alternatives thereto, still other assemblies and arrangements may be suggested to those skilled in the art. It is also to be appreciated that the features of the foregoing track support sub-frame assemblies can be arranged in different combinations. The foregoing description should therefore be construed to include all those embodiments within the spirit and scope of the following claims.

What is claimed is:

1. A vehicle track assembly comprising:
a) a track having an interior surface from which a plurality of drive lugs project and an exterior surface from which a plurality of ground lugs project and including a surface region defining a footprint whereat the track ground lugs engage the terrain; and
b) a framework including a drive sprocket and a plurality of primary idler wheels mounted to a longitudinal frame arm, wherein said track is circumferentially trained around said framework such that the drive lugs engage said sprocket, wherein said primary idler wheels are mounted to overly and tangentially contact the track interior surface at the footprint, wherein said primary idler wheels are coupled to a plurality of axles that transversely project from the longitudinal frame arm, wherein said primary idler wheels are aligned seriatim adjacent left and right lateral, longitudinal peripheral edges of said track and longitudinal gaps are defined between successive left and right primary idler wheels, and wherein a plurality of members are mounted to the frame arm transversely intermediate the left and right primary idler wheels and in longitudinally staggered relation to the left and right primary idler wheels to contact the interior surface of the track in the longitudinal gaps between successive left and right primary idler wheels to prevent said track from flexing in the gaps and losing contact with the terrain.

2. A vehicle track assembly as set forth in claim 1 wherein said plurality of members comprises a plurality of secondary idler wheels aligned to tangentially contact the track interior surface in the gaps.

3. A vehicle track assembly as set forth in claim 2 wherein said left and right primary idler wheels are aligned seriatim along first and second parallel longitudinal axes and wherein said secondary idler wheels are aligned seriatim along a third longitudinal axis that extends parallel to said first and second longitudinal axes.

4. A vehicle track assembly as set forth in claim 3 wherein said left and right primary idler wheels are mounted to opposite ends of a plurality of first axles that transversely extend from said frame arm and wherein said secondary idler wheels are mounted to a plurality of second axles that transversely extend from said frame arm.

5. A vehicle track assembly as set forth in claim 2 wherein said secondary idler wheels are arranged such that the diameter of each secondary idler wheel longitudinally overlaps the diameter of at least one of each of the left and/or right primary idler wheels.

6. A vehicle track assembly as set forth in claim 2 wherein said primary and secondary idler wheels exhibit different widths.

7. A vehicle track assembly as set forth in claim 2 wherein at least one primary idler wheel and one secondary idler wheel are mounted to a frame piece that is pivotally coupled to said frame arm.

8. A vehicle track assembly as set forth in claim 7 wherein said framework includes stop members mounted to restrict pivotal motion of said frame piece.

9. A vehicle track assembly as set forth in claim 1 wherein said plurality of axles each support a left and a right primary idler wheel, wherein said left and right primary idler wheels are respectively aligned along first and second longitudinal axes, wherein said plurality of members comprise a plurality of secondary idler wheels mounted to a plurality of second axles mounted to said frame arm, wherein said secondary idler wheels are longitudinally staggered relative to the left and right primary idler wheels to contact the interior surface of the track at surface regions in the longitudinal gaps between successive left and right primary idler wheels.

10. A vehicle track as set forth in claim 1 wherein the plurality of members comprise a plurality of planar surfaces mounted to overly the footprint and longitudinally extend to prevent or vertically limit flexion of the track and loss of terrain contact in the gaps.

11. A vehicle track as set forth in claim 1 wherein the plurality of members comprise a rail mounted to longitudinally extend and having a portion that contacts the interior surface of the track in the region of at least one gap opposite the footprint.

12. A vehicle track assembly as set forth in claim 1 wherein the plurality of members comprise a plurality of balls mounted to contact the interior surface of the track in the region of at least one gap opposite the footprint.

13. A vehicle track as set forth in claim 1 wherein the plurality of members are resiliently biased to resist contact between the members and the track interior surface in the gaps.

14. A vehicle track assembly comprising:
a) a track having an interior surface from which a plurality of drive lugs project and an exterior surface from which a plurality of ground lugs project and including a surface region defining a footprint whereat the track engages the terrain; and
b) a framework including a drive sprocket and a plurality of primary idler wheels mounted to a longitudinal frame arm, wherein said track is circumferentially trained around said framework such that the drive lugs engage said sprocket, wherein said primary idler wheels are mounted to overly the footprint and tangentially contact the track interior surface, wherein said primary idler wheels are coupled to a plurality of axles that transversely project from the longitudinal frame arm, wherein said primary idler wheels are aligned seriatim adjacent left and right lateral, longitudinal peripheral edges of said track and longitudinal gaps are defined between successive primary idler wheels, and wherein a plurality of secondary idler wheels are mounted to the frame arm transversely intermediate the primary idler wheels and in longitudinally staggered relation to the primary idler wheels to contact the interior surface of the track in the longitudinal gaps between successive primary idler wheels to prevent said track from flexing in the gaps and losing contact with the terrain.

15. A vehicle track assembly as set forth in claim 14 wherein left and right ones of said primary idler wheels are mounted to each of a plurality of first axles, wherein said left and right primary idler wheels are respectively aligned along first and second longitudinal axes that extend parallel to the lateral peripheral edges of said track, wherein said first axles are longitudinally offset from each other, wherein said plurality of secondary idler wheels are mounted to a plurality of second axles longitudinally staggered between successive first axles, and wherein the secondary idler wheels are aligned seriatim along a third axis that extends parallel to and between said first and second longitudinal axes.

16. A vehicle track assembly as set forth in claim 14 wherein opposite ends of said plurality of axles respectively support a left and a right primary idler wheel, wherein said left and right primary idler wheels are respectively aligned along first and second longitudinal axes, wherein said plurality of secondary idler wheels are mounted to a plurality of axles mounted to said frame arm, wherein said secondary idler wheels are longitudinally staggered relative to the left and right primary idler wheels to contact the interior surface of the track at surface regions in the longitudinal gaps between successive left and right primary idler wheels.

17. A vehicle track assembly as set forth in claim 14 wherein the diameters of said secondary idler wheels are arranged to longitudinally overlap the diameters of transversely adjacent left and/or right primary idler wheels.

18. A vehicle track assembly comprising:
a) a track having an interior surface from which a plurality of drive lugs project and an exterior surface from which a plurality of ground lugs project and including a surface region defining a footprint whereat the track engages the terrain; and
b) a framework including a drive sprocket and a plurality of primary idler wheels mounted to a longitudinal frame arm, wherein said track is circumferentially trained around said framework such that the drive lugs engage said sprocket, wherein said primary idler wheels are mounted to overly the footprint and tangentially contact the interior surface of the track, wherein opposite ends of a plurality of axles that transversely project from the longitudinal frame arm each support at least one of said primary idler wheels, wherein said primary idler wheels are aligned seriatim adjacent left and right lateral, longitudinal peripheral edges of said track and longitudinal gaps are defined between successive left and right primary idler wheels, and wherein a plurality of members having rolling surfaces are resiliently mounted to the frame arm intermediate the left and right primary idler wheels and in longitudinally staggered relation to the left and right primary idler wheels to contact the interior surface of the track in the longitudinal gaps between successive left and right primary idler wheels to prevent said track from flexing in the gaps and losing contact with the terrain.

19. A vehicle track assembly as set forth in claim 18 wherein said plurality of members comprises a plurality of secondary idler wheels aligned to tangentially contact the interior track surface in the gaps.

20. A vehicle track assembly as set forth in claim 18 wherein left and right ones of said primary idler wheels are mounted to each of a plurality of first axles, wherein the left and right primary idler wheels are respectively aligned along first and second longitudinal axes that extend parallel to the lateral peripheral edges of said track, wherein said first axles are longitudinally offset from each other, wherein said plurality of secondary idler wheels are mounted to a plurality of second axles longitudinally staggered between successive first axles, and wherein the secondary idler wheels are aligned seriatim along a third axis that extends parallel to and between said first and second longitudinal axes.

* * * * *